United States Patent
Zhang (10) Patent No.: US 12,353,859 B2
(45) Date of Patent: Jul. 8, 2025

(54) METHOD AND DEVICE FOR GENERATING BASED ON ANDROID MOBILE OPERATING SYSTEM (OS)

(71) Applicant: BOE Technology Group Co., Ltd., Beijing (CN)

(72) Inventor: Zhe Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 63 days.

(21) Appl. No.: 18/272,124

(22) PCT Filed: Oct. 22, 2021

(86) PCT No.: PCT/CN2021/125633
§ 371 (c)(1),
(2) Date: Jul. 13, 2023

(87) PCT Pub. No.: WO2022/174613
PCT Pub. Date: Aug. 25, 2022

(65) Prior Publication Data
US 2024/0069877 A1    Feb. 29, 2024

(30) Foreign Application Priority Data
Feb. 19, 2021    (CN) .......................... 202110191967.2

(51) Int. Cl.
*G06F 8/41* (2018.01)
*G06F 8/20* (2018.01)
*G06F 8/36* (2018.01)

(52) U.S. Cl.
CPC ................. *G06F 8/41* (2013.01); *G06F 8/24* (2013.01); *G06F 8/36* (2013.01)

(58) Field of Classification Search
CPC ................. G06F 8/41; G06F 8/24; G06F 8/36
(Continued)

(56) References Cited

U.S. PATENT DOCUMENTS 8,572,504 B1 * 10/2013 Forstot ..................... G06N 5/02
715/764
8,819,772 B2 * 8/2014 Bettini ................ H04L 63/1433
709/227
(Continued)

FOREIGN PATENT DOCUMENTS

CN    110007925 A    7/2019
CN    112083930 A    12/2020
(Continued)

OTHER PUBLICATIONS

Zhang et al, "Automated Test Generation for Detection of Leaks in Android Applications", ACM, pp. 64-70 (Year: 2016).*
(Continued)

*Primary Examiner* — Anil Khatri
(74) *Attorney, Agent, or Firm* — IPro, PLLC (57) ABSTRACT

A method and device for generating an application based on an Android system, and a storage medium. The method comprises: when a service compilation instruction is received, scanning and extracting annotation information of at least one call operation in a selected component required by a service engineering to form a call operation set, wherein the service engineering comprises script configuration information of the selected component; automatically registering the call operation set into a bus routing component, so that the selected component communicates with other components by means of the bus routing component; and compiling the service engineering to generate an application.

16 Claims, 5 Drawing Sheets

(58) Field of Classification Search
USPC .................................................. 717/125–155
See application file for complete search history.

(56) References Cited

U.S. PATENT DOCUMENTS

| | | | | |
|---|---|---|---|---|
| 9,158,512 | B1* | 10/2015 | Hucik | G06F 8/41 |
| 10,073,679 | B2* | 9/2018 | Straub | G06F 3/04847 |
| 10,387,125 | B2* | 8/2019 | Chenny | G06F 8/36 |
| 10,841,385 | B2* | 11/2020 | Straub | G06F 8/20 |
| 10,990,773 | B1* | 4/2021 | Herbel | H04W 4/80 |
| 11,461,378 | B1* | 10/2022 | Bhushan | G06F 16/248 |
| 11,470,194 | B2* | 10/2022 | Cornwell | H04M 3/2218 |
| 11,481,194 | B1* | 10/2022 | Chowdhary | G06F 11/3624 |
| 12,020,354 | B2* | 6/2024 | Brebner | G06T 11/20 |
| 12,079,626 | B2* | 9/2024 | Brebner | G06F 8/36 |
| 12,141,732 | B1* | 11/2024 | Solmer | G06Q 10/067 |
| 2007/0067373 | A1* | 3/2007 | Higgins | G06Q 30/00 |
| 2019/0310835 | A1 | 10/2019 | Gong et al. | |
| 2021/0117168 | A1* | 4/2021 | Jeong | G06F 3/04842 |

FOREIGN PATENT DOCUMENTS

| | | |
|---|---|---|
| CN | 112199092 A | 1/2021 |
| CN | 112769706 A | 5/2021 |
| CN | 112925562 A | 6/2021 |

OTHER PUBLICATIONS

Parada et al, "A model driven approach for Android applications development", IEEE, pp. 192-197 (Year: 2012).*
Silva et al, "Model Driven Engineering for Performance Testing in Mobile Applications", IEEE, pp. 1-7 (Year: 2020).*
Shi et al, "Qt-based Mobile Application GUI Style for Smart Phone Operating System", IEEE, pp. 1-4, (Year: 2010).*
Smutný, "Mobile development tools and cross-platform solutions", IEEE, pp. 1-4 (Year: 2012).*
CN202110191967.2 first office action.
PCT/CN2021/125633 international search report.

* cited by examiner

METHOD AND DEVICE FOR GENERATING BASED ON ANDROID MOBILE OPERATING SYSTEM (OS)

CROSS REFERENCE TO RELATED APPLICATIONS

The present application is a National Stage of International Application No. PCT/CN2021/125633, filed on Oct. 22, 2021, which claims priority to Chinese Patent Application No. 202110191967.2, filed to China National Intellectual Property Administration on Feb. 19, 2021, the entire contents of which are incorporated herein by reference.

TECHNICAL FIELD

The present disclosure relates to the technical field of mobile application, and particularly relates to a method and device for generating an application based on an Android system, and a storage medium.

BACKGROUND

With the development of mobile software, more and more software in the mobile terminal is developed using componentized and modular technologies.

Since a single component is formed by extracting duplicated code and merging the duplicated code, software in the mobile terminal is developed in a componentized manner to increase the reuse rate of the code.

However, components are in interdependency in the development process of conventional mobile applications, and the interdependency of the components results in the need for constant communication between developers of different components and joint tests as business functions of mobile application development are more and more complex, and business scenarios are more and more burdensome, which causes low development efficiency of components, leading to lower development efficiency of applications.

SUMMARY

The present disclosure provides a method and device for generating an application based on an Android system, and a storage medium, so as to solve the above technical problems existing in the prior art.

In a first aspect, in order to solve the above technical problems, an embodiment of the present disclosure provides a technical solution of a method for generating an application based on an Android system as follows: scanning and extracting annotation information for at least one call operation in a selected component required by business engineering to form a call operation set when a business compilation instruction is received, wherein the business engineering includes script configuration information for the selected component; registering the call operation set into a bus routing component automatically such that the selected component communicates with other components through the bus routing component; and compiling the business engineering to generate an application.

In a possible embodiment, before the scanning and extracting annotation information for at least one call operation in a selected component required by business engineering, the method further includes: scanning, by an annotation processor, annotation information for at least one type of call operation in component engineering corresponding to the selected component to form an information aggregation class for the at least one type of call operation when a component compilation instruction is received, wherein the component engineering includes to-be-compiled codes corresponding to the selected component; compiling the component engineering to generate the selected component; and encapsulating the selected component and the information aggregation class as a library file and storing the library file.

In a possible embodiment, the scanning and extracting the annotation information for the at least one call operation in the selected component required by the business engineering to form the call operation set when the business compilation instruction is received includes: determining a library file corresponding to the selected component from the stored library file when the business compilation instruction is received; and scanning and extracting an information aggregation class for the library file corresponding to the selected component to form the call operation set.

In a possible implementation, the registering the call operation set into the bus routing component automatically includes: obtaining a call path corresponding to each type of call operation in the call operation set to form a call path set, and registering the call path set into the bus routing component; and writing a component label corresponding to the call path set into a manifest file of the business engineering, so as to obtain a corresponding component label from the manifest file when the selected component in the business engineering is called, such that a corresponding call path is inquired by the bus routing component.

In a possible embodiment, the bus routing component includes: a component routing information management assembly, configured to manage the call operation set; a routing assembly, configured to receive a call request from a source component, inquire a to-be-called target component from the component routing information management assembly according to the call request, call the target component, and transmit a corresponding callback result to the source component through a bus assembly; and the bus assembly, configured to transmit information between the source component and the routing assembly.

In a possible implementation form, the routing assembly includes: a routing management assembly, configured to receive the call request from the source component, inquire the target call path of the to-be-called target component from the component routing information management assembly, and select the assembly corresponding to the call request to locate the target component according to the target call path; a page routing assembly, configured to locate the target component for which the call request is for calling a page, and transmit a corresponding callback result to the source component through the bus assembly; a service routing assembly, configured to locate the target component for which the call request is for calling a service, and transmit a corresponding callback result to the source component through the bus assembly; and an aspect oriented programming assembly, configured to manage call processes of components in the routing assembly.

In a possible implementation, the call operation includes one or more of:
 a page calling operation, a service calling operation, or a custom calling operation.

In a possible embodiment, the selected component inherits from a component class having a component interface.

In a second aspect, an embodiment of the present disclosure provides a device for generating an application based on an Android system, including:

a component unit, serving as a constituent element for business engineering, wherein the business engineering includes script configuration information for selected components required; a bus routing component, configured to communicate the different selected components in the component unit; an automatic component registration plug-in, configured to scan and extract annotation information for at least one call operation in a component included in the business engineering to form a call operation set when a business compilation instruction is received; and register the call operation set into the bus routing component automatically such that the selected components communicate with other components through the bus routing component; a generation unit, configured to compile the business engineering to generate an application.

In a possible embodiment, the bus routing component includes: a component routing information management assembly, configured to manage the call operation set; a routing assembly, configured to receive a call request from a source component, inquire a to-be-called target component from the component routing information management assembly according to the call request, call the target component, and transmit a corresponding callback result to the source component through a bus assembly; and the bus assembly, configured to transmit information between the source component and the routing assembly.

In a possible implementation form, the routing assembly includes: a routing management assembly, configured to receive a call request from the source component, inquire a target call path of a to-be-called target component from the component routing information management assembly, and select an assembly corresponding to the call request to locate the target component according to the target call path; a page routing assembly, configured to locate a target component for which the call request is for calling a page, and transmit a corresponding callback result to the source component through the bus assembly; a service routing assembly, configured to locate a target component for which the call request is for calling a service, and transmit a corresponding callback result to the source component through the bus assembly; and an aspect oriented programming assembly, configured to manage call processes of components in the routing assembly.

In a third aspect, an embodiment of the present disclosure further provides a device for generating an application based on an Android system, including: at least one processor, and a memory, connected with the at least one processor; wherein the memory stores an instruction executable by the at least one processor, and the at least one processor performs the method in the first aspect by executing the instruction stored in the memory.

In a fourth aspect, an embodiment of the present disclosure further provides a readable storage medium, including: a memory, wherein the memory is configured to store an instruction that, when executed by a processor, causes a device including the readable storage medium to perform the method in the above first aspect.

DETAILED DESCRIPTION

Embodiments of the present disclosure provide a method and device for generating an application based on an Android system, and a storage medium, so as to solve the above technical problems existing in the prior art.

To better understand the above technical solutions, the technical solutions of the present disclosure are described in detail below with reference to the drawings and specific embodiments. It should be understood that the embodiments of the present disclosure and the specific features in the embodiments are detailed descriptions of the technical solutions of the present disclosure, rather than limiting the technical solutions of the present disclosure. The embodiments and the technical features in the embodiments of the present disclosure can be combined with each other without conflict.

An automated construction system for a mobile application plans different roles and authorization for developers and users through user authorization management. A user may view, upload, manage, edit mobile-end components stored in the system through a mobile application open platform, and perform related operations such as mobile-end software construction, component combination, constructed software management, detail inquiry and reference frequency statistics through the system.

Figure 1:
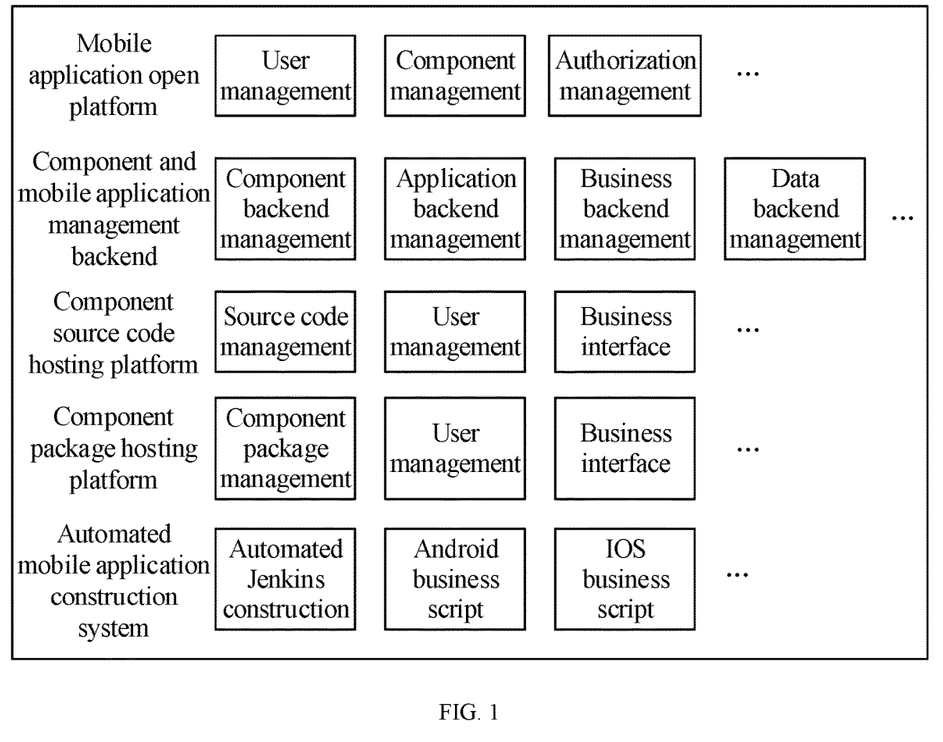
FIG. 1 is a business function diagram of an automated construction system for a mobile application provided by the present disclosure.

Referring to FIG. 1 which is a business function diagram of an automated construction system for a mobile application provided by the present disclosure, the system mainly includes five parts: a mobile application open platform, a component(s) and mobile application management backend, a component source code hosting platform, a component package hosting platform, and an automated mobile application construction system.

The mobile application open platform is a portal for a business system to interact with the user, is mainly connected with the component and mobile application management backend in a manner of calling through a network interface, and mainly includes a user management assembly, a component management assembly, a constructed application management assembly, an authorization management assembly, and other assemblies.

The component and mobile application management backend is mainly configured to store component and mobile application information and details thereof, and provide business data for the mobile application open platform, and mainly includes parts such as a component management backend, a mobile application management backend, a business service backend and a data backend.

The component source code hosting platform is mainly configured for the purposes of component source code storage and management, may serve as an independent closed-loop system for use, and may also perform operations such as source code downloading through an external interface provided, and a user management assembly of the component source code hosting platform is self-organized, and mainly includes source code management, user management, business interface, etc.

The component package hosting platform is mainly configured for the purposes of component package storage and management, may serve as an independent closed-loop system for use, and may also perform operations such as downloading of dependent packages for the components through an external interface provided, and a user management assembly of the component package hosting platform is self-organized, and mainly includes component management, user management, business interface, etc.

The automated mobile application construction system is mainly configured for the purposes of automated mobile application construction, workflow management, etc., may serve as an independent closed-loop system for use, and may receive construction parameters transmitted by the component and mobile application management backend, through an external interface provided by the automated mobile application construction system, calling the interface of the system in a manner of network connection to implement a complete automated construction process mainly including automated jenkins construction, Android business scripts, IOS business scripts, etc.

The components in the above system improve the development efficiency of applications by decoupling the components from each other in the following manner.

Figure 2:
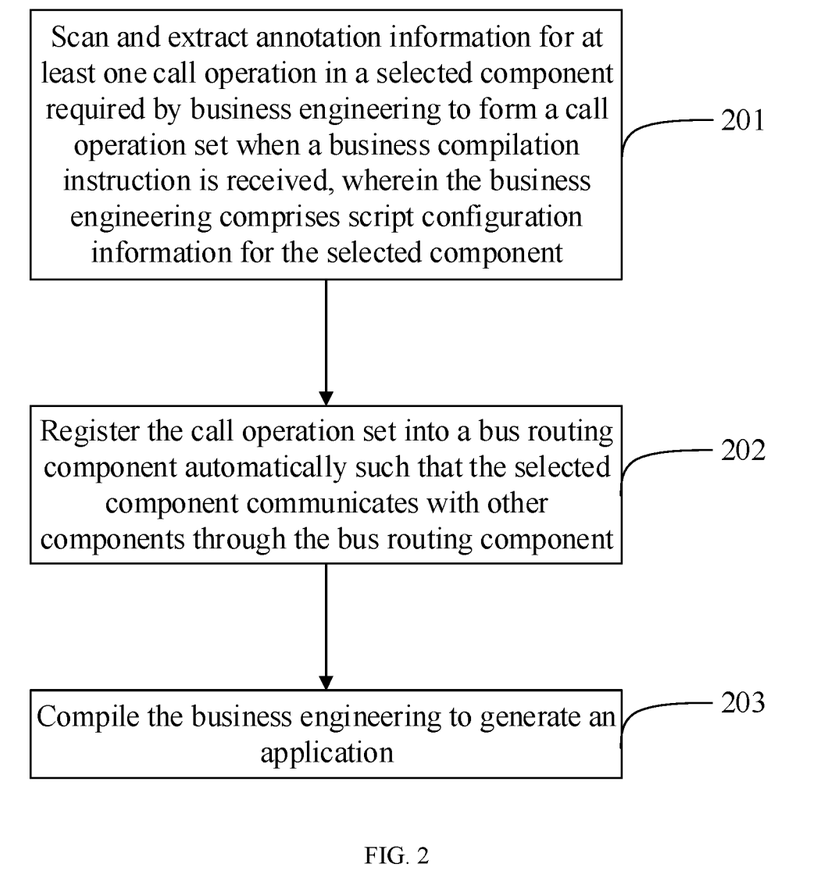
FIG. 2 is a flowchart of a method for generating an application based on an Android system provided by an embodiment of the present disclosure.

Referring to FIG. 2, an embodiment of the present disclosure provides a method for generating an application based on an Android system, which has the following processing process.

Step 201: annotation information for at least one call operation in a selected component required by business engineering is scanned and extracted to form a call operation set when a business compilation instruction is received, wherein the business engineering includes script configuration information for the selected component. In general, the selected component is an element selected from a plurality of components that form an application.

Step 202: the call operation set is registered into a bus routing component automatically such that the selected component communicates with other components through the bus routing component.

Step 203: the business engineering is compiled to generate an application.

Before annotation information for at least one call operation in the selected component included in the business engineering is scanned and extracted, if one or more selected components required by the business engineering do not yet exist and a corresponding one or more selected components needs to be created, the selected component may be created in the following manner: scanning, by an annotation processor, annotation information for at least one type of call operation in component engineering corresponding to the selected component to form an information aggregation class for the at least one type of call operation when a component compilation instruction is received, wherein the component engineering includes to-be-compiled codes corresponding to the selected component; compiling the component engineering to generate the selected component; encapsulating the selected component and the information aggregation class as a corresponding library file and storing the library file.

When writing codes for the selected component (i.e., the component engineering), a component class may be set based on a function corresponding to the selected component and inherit a component interface, such that the selected components inheriting the component class may communicate with each other via the component interface.

For example, when a selected component for a timeline needs to be developed, a component class for the timeline needs to be defined and the component class inherits a component interface (IappComponent). The selected component thus developed has a communication interface.

During writing the component code, a special mark may be made on a code class using a java annotation mechanism to form annotation information from which it can be determined which call operation is provided by the selected component.

The call operation may be any one of, or any combination of, a page calling operation, a service calling operation, or a custom calling operation. The custom calling operation includes obtaining data, and transmitting messages. These call operations may transmit information through a general message object (BMessage).

For example, an album component (contained within an application as a selected component of the application) may provide an album inquiry function externally, and may provide a call operation which is a page calling operation by which pictures in an album may be displayed. In component engineering for the album component, a special mark, such as "@Page", may be made on a code class corresponding to the page calling operation to form corresponding annotation information.

As another example, a picture processing service component (contained within an application as a selected component of the application) may provide a picture processing function externally, and may provide a call operation which is a service calling operation by which pictures may be processed (for example, may be clipped, retouched, etc.). In component engineering for the picture processing service component, a special mark, such as "@Service", may be made on a code class corresponding to the service calling operation to form corresponding annotation information.

As another example, a picture uploading component (contained within an application as a selected component of the application) may provide a picture uploading function externally, and may provide a call operation which is a custom calling operation by which a picture at a specified location may be uploaded to a target location. In component engineering for the picture uploading component, a special mark, such as "@Custom", may be made on a code class corresponding to the custom calling operation to form corresponding annotation information.

After component engineering (i.e., to-be-compiled codes for a component) is written, annotation information for at least one call operation in the component engineering corresponding to a component is scanned by an annotation processor when the component compilation instruction is received, so as to form an information aggregation class for the at least one call operation. The component engineering is compiled to generate a selected component. The selected component and the information aggregation class are encapsulated as a library file for storage.

For example, after the component engineering for the album component is written, the annotation information ("@Page") of the page calling operation in the component engineering for the album component is scanned by the annotation processor when the component compilation instruction is received, so as to form an information aggregation class for the page calling operation in a system configuration file (i.e., build file) of the album component, and meanwhile, form a corresponding help class by which developers may use the album component through better interpretation and assistance. The component engineering for the album component is then compiled to generate the album component. Afterwards, the codes of the component and the information aggregation class in the build file and the help class are packaged into an aar file (one library file) by a gradle plug-in, and the aar file is stored in a Maven private library and is used to be called by the application.

After all of the selected components required for an application have been prepared, business engineering for an application may be written to configure script information for selected components contained therein. The above steps 201-203 may be performed after the business engineering is written.

The step 201 that the annotation information for the at least one call operation in all selected components contained by the business engineering is scanned and extracted to form the call operation set when the business compilation instruction is received is implemented in the following manner: determining library files corresponding to the selected components from the stored library files when the business compilation instruction is received; and scanning and extracting information aggregate classes for the library files corresponding to the selected components to form a call operation set.

For example, when a developer needs to develop an application, selected components (assumed to include the album component, the picture processing service component, and the picture uploading component) required may be selected from the Maven private library in the corresponding business engineering. When the writing for the business engineering is completed and the business engineering is compiled, the information aggregation classes in the library files corresponding to the album component, the picture processing service component, and the picture uploading component used in the business engineering are scanned and extracted by a compiler (ASM) to form a call operation set. The call operation set may be present in the form of a table, for example, a service table includes the call operations, call paths, component identifications, or the like corresponding to the album component, the picture processing service component, and the picture uploading component.

The step 202 and the step 203 may be performed after the call operation set is formed.

The step 202 that the call operation set is registered into the bus routing component automatically may be implemented in the following manner: obtaining a call path corresponding to each call operation in the call operation set to form a call path set, and registering the call path set into the bus routing component; and writing a component label corresponding to the call path set into a manifest file (Manifest) of the business engineering to obtain a corresponding component label from the manifest file when the component in the business engineering is called, such that a corresponding call path is inquired by the bus routing component.

For example, the call path of the album component in the business engineering is Maven.Photos, the call path of the picture processing service component is Maven.PhotoPro, the call path of the picture uploading component is Maven.PhotoUp, and Maven.Photos, Maven.PhotoPro, and Maven.PhotoUp form the call path set, and the call path set is registered into the bus routing component. Meanwhile, component labels (Photos, PhotoPro, PhotoUp) corresponding to the call path set are written into the manifest file (Manifest) of the business engineering, such that a component label corresponding to a component is obtained from the manifest file when the component in the business engineering is called, thereby inquiring a call path corresponding to a component through the bus routing component. Finally, the business engineering is compiled to generate an application.

In the present disclosure, the bus routing component includes a component routing information management assembly configured to manage the call operation set; the component routing information management assembly is configured to manage the call operation set; a bus assembly is configured to transmit information between a source component and a routing assembly; and a routing assembly is configured to receive a call request from the source component, inquire a to-be-called target component from the component routing information management assembly according to the call request, call the target component, and transmit a corresponding callback result to the source component through the bus assembly.

In the present disclosure, the routing assembly includes: a routing management assembly, configured to receive the call request from the source component, inquire the target call path of the to-be-called target component from the component routing information management assembly, and select the assembly corresponding to the call request to locate the target component according to the target call path; a page routing assembly, configured to locate a target component for which the call request is for calling a page, and transmit a corresponding callback result to the source component through the bus assembly; a service routing assembly, configured to locate a target component for which the call request is for calling a service, and transmit a corresponding callback result to the source component through the bus assembly; and an aspect oriented programming (AOP) assembly, configured to manage call processes of components in the routing assembly.

Figure 3:
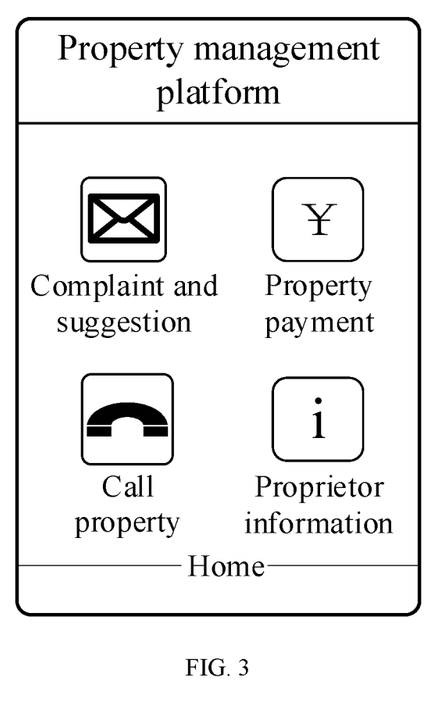
FIG. 3 is a schematic diagram of a display interface for an application provided by an embodiment of the present disclosure.

Referring to FIG. 3, FIG. 3 is a schematic diagram of a display interface for an application provided by an embodiment of the present disclosure.

Figure 4:
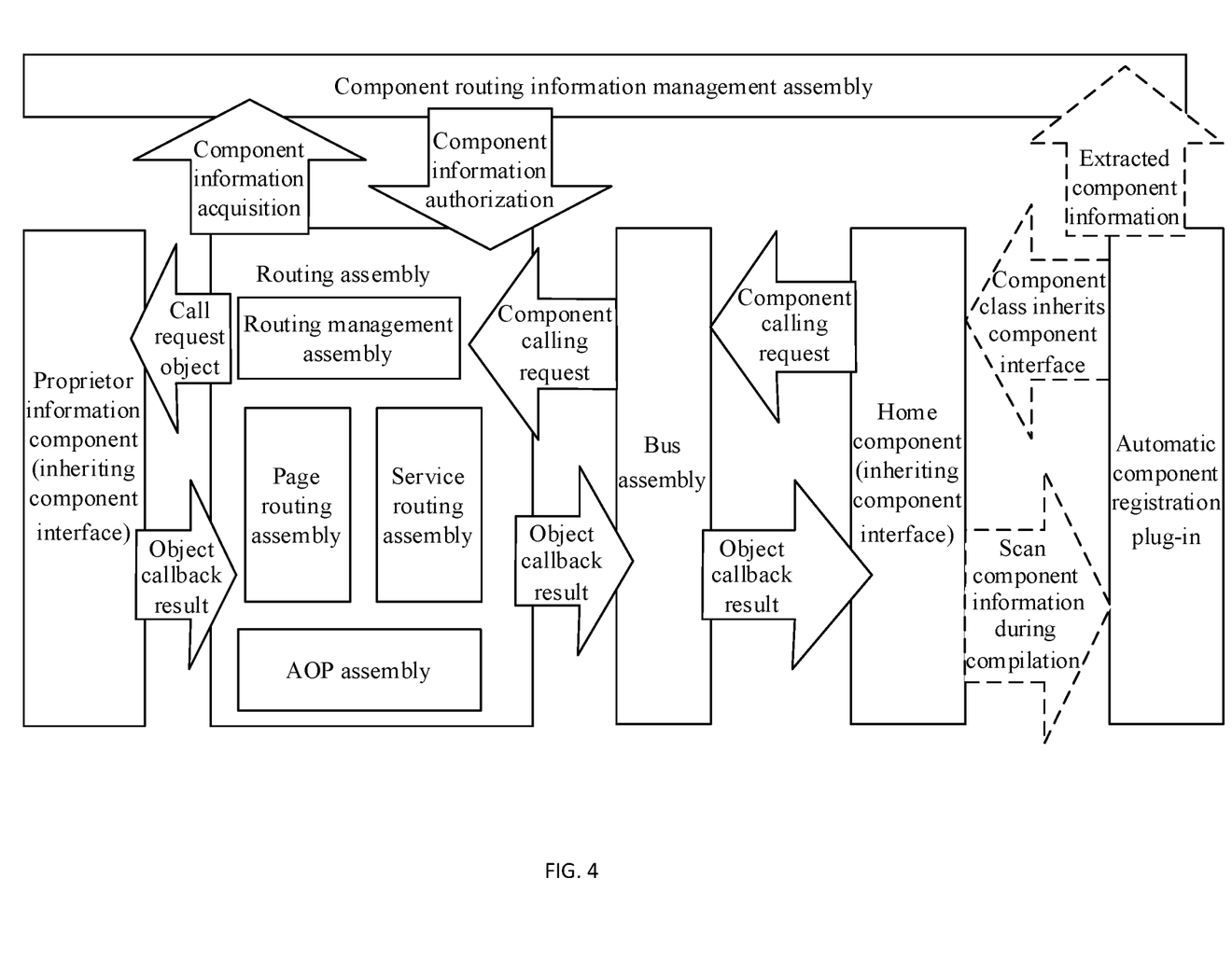
FIG. 4 is a schematic diagram illustrating communication between components provided by an embodiment of the present disclosure.

The application in FIG. 3 is a property management platform that requires a selected component including a "home" component, and a page corresponding to the "home" component includes a "complaint and suggestion" component, a "property payment" component, a "property calling" component, and a "proprietor information" component. In an example that a user accesses the "proprietor information, a schematic diagram of the communication between the "home" component and the "proprietor information" component is shown in FIG. 4 when the user clicks on the "proprietor information" component in the "home" component. FIG. 4 is a schematic diagram illustrating the communication between the components provided by the embodiment of the present disclosure.

The "home" component (source component) sends a call request to the "bus assembly". The "bus assembly" transmits the call request to the "routing management assembly". The "routing management assembly" inquires registration information for the target component (i.e., the "proprietor information" component) in a call request object the through the "component routing information management assembly"; after corresponding response authorization information (including a call path) is obtained, it is determined that an assembly corresponding to the call request is the page routing assembly; and then, the page routing assembly locates to the target component (the "proprietor information" component) according to the call path, generates a page object corresponding to the "proprietor information", and subsequently transmit a callback result to the "bus assembly" which returns the page object into the "home component" so that the user can access the proprietor information.

It should be noted that the functions achieved by an automatic component registration plug-in in FIG. 4 are the functions achieved in steps 201-202.

Figure 5:
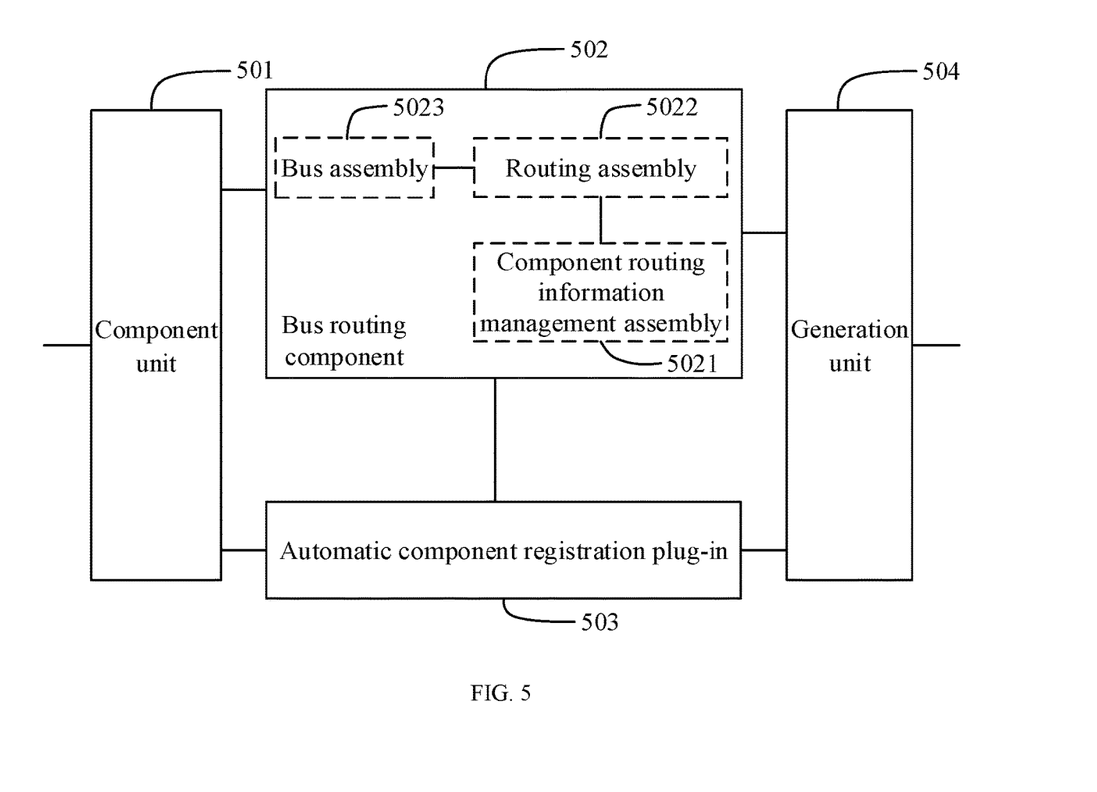
FIG. 5 is a schematic structural diagram of a device for generating an application based on an Android system provided by an embodiment of the present disclosure.

Based on the same inventive concept, an embodiment of the present disclosure provides a device for generating an application based on an Android system. Specific embodiments of a method for generating an application in the device may refer to the description of the method embodiments, and the repetitions are not described. Referring to FIG. 5, the device includes: a component unit 501, serving as a constituent element for business engineering, wherein the business engineering includes script configuration information for selected components required; a bus routing component 502, configured to communicate the different selected components in the component unit 501; an automatic component registration plug-in 503, configured to scan and extract annotation information for at least one call operation in a component included in the business engineering to form a call operation set when a business compilation instruction is received; and register the call operation set into the bus routing component automatically such that the selected components communicate with other components through the bus routing component; and a generation unit 504, configured to compile the business engineering to generate an application.

In a possible embodiment, the bus routing component 502 includes: a component routing information management assembly 5021, configured to manage the call operation set; a routing assembly 5022, configured to receive a call request from a source component, inquire a to-be-called target component from the component routing information management assembly according to the call request, call the target component, and transmit a corresponding callback result to the source component through a bus assembly; and the bus assembly 5023, configured to transmit information between the source component and the routing assembly.

In a possible embodiment, the routing assembly 5022 includes: a routing management assembly, configured to receive the call request from the source component, inquire the target call path of the to-be-called target component from the component routing information management assembly, and select the assembly corresponding to the call request to locate the target component according to the target call path; a page routing assembly, configured to locate the target component for which the call request is for calling a page, and transmit a corresponding callback result to the source component through the bus assembly; a service routing assembly, configured to locate the target component for which the call request is for calling a service, and transmit a corresponding callback result to the source component through the bus assembly; and an aspect oriented programming assembly, configured to manage call processes of components in the routing assembly.

Based on the same inventive concept, an embodiment of the present disclosure provides a device for generating an application based on an Android system, including: at least one processor, and a memory, connected with the at least one processor; wherein the memory stores an instruction executable by the at least one processor, and the at least one processor performs the above method for generating the application by executing the instruction stored in the memory.

Based on the same inventive concept, an embodiment of the present disclosure further provides a readable storage medium, including: a memory, wherein the memory is configured to store an instruction that, when executed by a processor, causes a device including the readable storage medium to perform the above method for generating the application.

Those skilled in the art will appreciate that the embodiments of the present disclosure may be provided as a method, a system or a computer program product. Accordingly, the embodiments of the present disclosure may take the form of an entirely hardware embodiment, an entirely software embodiment, or an embodiment combining software and hardware. Furthermore, the embodiments of the present disclosure may take the form of a computer program product implemented on one or more computer available storage media (including but not limited to a disk memory, CD-ROM, an optical memory, etc.) containing computer available program codes therein.

The embodiments of the present disclosure are described with reference to flow charts and/or block diagrams of methods, devices (systems), and computer program products according to the embodiments of the present disclosure. It should be understood that each flow and/or block in the flow charts and/or block diagrams and a combination of flows and/or blocks in the flow charts and/or block diagrams may be implemented by computer program instructions. These computer program instructions can be provided to a general-purpose computer, a dedicated computer, an embedded processor or processors of other programmable data processing devices to produce a machine, such that instructions executed by the computer or the processor of other programmable data processing device produce a device configured to implement functions specified in one or more flows of the flow charts and/or one or more blocks of the block diagrams.

The computer program instructions may also be stored in a computer readable memory capable of booting the computer or other programmable data processing devices to operate in a particular manner such that the instructions stored in the computer readable memory produce an article of manufacture including an instruction apparatus, and the instruction apparatus implements functions specified in one or more flows of the flow charts and/or one or more blocks of the block diagrams.

These computer program instructions may also be loaded onto the computer or other programmable data processing devices such that a series of operational steps are executed on the computer or other programmable devices to produce computer-implemented processing. Therefore, the instructions executed on the computer or other programmable devices provide steps for implementing functions specified in one or more flows of the flow charts and/or one or more blocks of the block diagrams.

Obviously, those skilled in the art may make various changes and modifications to the present disclosure without departing from the spirit and scope of the present disclosure. Therefore, the present disclosure intends to include these changes and modifications if these changes and modifications of the present disclosure fall within the scope of the appended claims and equivalent technologies thereof.

What is claimed is:

1. A method for generating an application, performed by an electronic device based on an Android Mobile Operating System (OS), wherein the method comprises system, comprising:

scanning and extracting, by at least one processor of the electronic device, annotation information for at least one call operation in a selected component required by business engineering to form a call operation set when a business compilation instruction is received, wherein the business engineering comprises script configuration information for the selected component;

registering, by the at least one processor, the call operation set into a bus routing component automatically such that the selected component communicates with other components through the bus routing component; and compiling, by the at least one processor, the business engineering to generate an application; and displaying, by the at least one processor, an icon of the application on a display of the electronic device;

wherein the bus routing component comprises a component routing information management assembly and a routing assembly, and the method further comprises:

controlling, by the at least one processor, the component routing information management assembly to manage the call operation set;

controlling, by the at least one processor, the routing assembly to receive a call request from a source component, inquire a to-be-called target component from the component routing information management assembly according to the call request, call the target component, and transmit a corresponding callback result to the source component through a bus assembly; and controlling, by the at least one processor, the bus assembly to transmit information between the source component and the routing assembly;

wherein the registering, by the at least one processor, the call operation set into the bus routing component automatically comprises:

obtaining, by the at least one processor, a call path corresponding to each type of call operation in the call operation set to form a call path set, and registering, by the at least one processor, the call path set into the bus routing component; and writing, by the at least one processor, a component label corresponding to the call path set into a manifest file of the business engineering, so as to obtain a corresponding component label from the manifest file when the selected component in the business engineering is called, such that a corresponding call path is inquired by the bus routing component.

2. The method according to claim 1, wherein before the scanning and extracting, by the at least one processor, the annotation information for the at least one call operation in the selected component required by the business engineering, the method further comprises:

controlling, by the at least one processor, an annotation processor of the electronic device to scan annotation information for at least one type of call operation in component engineering corresponding to the selected component to form an information aggregation class for the at least one type of call operation when a component compilation instruction is received, wherein the component engineering comprises to-be-compiled codes corresponding to the selected component;

compiling, by the at least one processor, the component engineering to generate the selected component; and encapsulating, by the at least one processor, the selected component and the information aggregation class as a corresponding library file and storing the library file.

3. The method according to claim 2, wherein the scanning and extracting, by the annotation processor, the annotation information for the at least one call operation in the selected component required by the business engineering to form the call operation set when the business compilation instruction is received comprises:

determining, by the annotation processor, a library file corresponding to the selected component from the stored library file when the business compilation instruction is received; and scanning and extracting, by the annotation processor, an information aggregation class for the library file corresponding to the selected component to form the call operation set.

4. The method according to claim 3, wherein the call operation comprises one or more of:

a page calling operation, a service calling operation, or a custom calling operation.

5. The method according to claim 3, wherein the call operation comprises one or more of:

a page calling operation, a service calling operation, or a custom calling operation.

6. The method according to claim 2, wherein the call operation comprises one or more of:

a page calling operation, a service calling operation, or a custom calling operation.

7. The method according to claim 2, further comprising: controlling, by the at least one processor, the selected component to inherit from a component class having a component interface.

8. The method according to claim 1, wherein the routing assembly comprises a routing management assembly, a page routing assembly, a service routing assembly, and an aspect oriented programming assembly, and the method further comprises:

controlling, by the at least one processor, a routing management assembly to receive the call request from the source component, inquire the target call path of the to-be-called target component from the component routing information management assembly, and select the assembly corresponding to the call request to locate the target component according to the target call path;

controlling, by the at least one processor, a page routing assembly to locate the target component for which the call request is for calling a page, and transmit a corresponding callback result to the source component through the bus assembly;

controlling, by the at least one processor, a service routing assembly to locate the target component for which the call request is for calling a service, and transmit a corresponding callback result to the source component through the bus assembly; and controlling, by the at least one processor, an aspect oriented programming assembly to manage call processes of components in the routing assembly.

9. The method according to claim 1, wherein the call operation comprises one or more of:

a page calling operation, a service calling operation, or a custom calling operation.

10. The method according to claim 1, further comprising: controlling, by the at least one processor, the selected component to inherits from a component class having a component interface.

11. An electronic device based on an Android Mobile Operating System (OS) automatic component registration device based on an Android system, comprising:

at least one processor, and a memory, connected with the at least one processor;

wherein the memory stores an instruction executable by the at least one processor, and the at least one processor performs following steps by executing the instruction stored in the memory:

scanning and extracting annotation information for at least one call operation in a selected component required by business engineering to form a call operation set when a business compilation instruction is received, wherein the business engineering comprises script configuration information for the selected component;

registering the call operation set into a bus routing component automatically such that the selected component communicates with other components through the bus routing component; and compiling the business engineering to generate an application; and displaying an icon of the application on a display of the electronic device;

wherein the bus routing component comprises a component routing information management assembly and a routing assembly, and the at least one processor further performs following steps by executing the instruction stored in the memory:

controlling the component routing information management assembly to manage the call operation set;

controlling the routing assembly to receive a call request from a source component, inquire a to-be-called target component from the component routing information management assembly according to the call request, call the target component, and transmit a corresponding callback result to the source component through a bus assembly; and controlling the bus assembly to transmit information between the source component and the routing assembly;

wherein the registering the call operation set into the bus routing component automatically comprises:

obtaining a call path corresponding to each type of call operation in the call operation set to form a call path set, and registering the call path set into the bus routing component; and writing a component label corresponding to the call path set into a manifest file of the business engineering, so as to obtain a corresponding component label from the manifest file when the selected component in the business engineering is called, such that a corresponding call path is inquired by the bus routing component.

12. The electronic device according to claim 11, wherein before the scanning and extracting the annotation information for the at least one call operation in the selected component required by the business engineering, the at least one processor further performs following steps by executing the instruction stored in the memory:

controlling an annotation processor of the electronic device to scan annotation information for at least one type of call operation in component engineering corresponding to the selected component to form an information aggregation class for the at least one type of call operation when a component compilation instruction is received, wherein the component engineering comprises to-be-compiled codes corresponding to the selected component;

compiling the component engineering to generate the selected component; and encapsulating the selected component and the information aggregation class as a corresponding library file and storing the library file.

13. The electronic device according to claim 12, wherein the scanning and extracting the annotation information for the at least one call operation in the selected component required by the business engineering to form the call operation set when the business compilation instruction is received comprises:

determining a library file corresponding to the selected component from the stored library file when the business compilation instruction is received; and scanning and extracting an information aggregation class for the library file corresponding to the selected component to form the call operation set.

14. The electronic device according to claim 11, wherein the routing assembly comprises a routing management assembly, a page routing assembly, a service routing assembly, and an aspect oriented programming assembly, and the method further comprises, and the at least one processor further performs following steps by executing the instruction stored in the memory:

controlling a routing management assembly to receive the call request from the source component, inquire the target call path of the to-be-called target component from the component routing information management assembly, and select the assembly corresponding to the call request to locate the target component according to the target call path;

controlling a page routing assembly to locate the target component for which the call request is for calling a page, and transmit a corresponding callback result to the source component through the bus assembly;

controlling a service routing assembly to locate the target component for which the call request is for calling a service, and transmit a corresponding callback result to the source component through the bus assembly; and controlling an aspect oriented programming assembly to manage call processes of components in the routing assembly.

15. The electronic device according to claim 11, wherein the call operation comprises one or more of:

a page calling operation, a service calling operation, or a custom calling operation.

16. The electronic device according to claim 11, wherein the at least one processor further performs a following step by executing the instruction stored in the memory: controlling the selected component to inherit from a component class having a component interface.

\* \* \* \* \*